(12) United States Patent
Booker et al.

(10) Patent No.: US 9,989,118 B2
(45) Date of Patent: Jun. 5, 2018

(54) BRAKE CONDITIONING

(71) Applicant: ASTON MARTIN LAGONDA LIMITED, Warwickshire (GB)

(72) Inventors: Alastair Booker, Warwickshire (GB); Steve Cornforth, Warwickshire (GB); Ananda Haputhanthirige, Warwickshire (GB)

(73) Assignee: ASTON MARTIN LAGONDA LIMITED (GB)

( * ) Notice: Subject to any disclaimer, the term of this patent is extended or adjusted under 35 U.S.C. 154(b) by 26 days.

(21) Appl. No.: 15/039,817

(22) PCT Filed: Nov. 27, 2014

(86) PCT No.: PCT/GB2014/053513
§ 371 (c)(1),
(2) Date: May 26, 2016

(87) PCT Pub. No.: WO2015/079236
PCT Pub. Date: Jun. 4, 2015

(65) Prior Publication Data
US 2017/0009835 A1  Jan. 12, 2017

(30) Foreign Application Priority Data

Nov. 27, 2013 (GB) .................................. 1320960.6

(51) Int. Cl.
*F16D 69/02* (2006.01)
*F16D 65/12* (2006.01)
(Continued)

(52) U.S. Cl.
CPC ............ *F16D 69/023* (2013.01); *B24B 39/06* (2013.01); *F16D 65/126* (2013.01);
(Continued)

(58) Field of Classification Search
CPC .. F16D 69/023; F16D 65/126; F16D 2250/00; F16D 2200/0052; B24B 39/06; B62D 7/18; B60B 27/0063; B60B 27/0052
See application file for complete search history.

(56) References Cited

U.S. PATENT DOCUMENTS 3,500,589 A * 3/1970 Ellege ....................... B24B 7/16
451/290
4,262,452 A * 4/1981 Lopez ....................... B24B 7/17
451/210
(Continued)

FOREIGN PATENT DOCUMENTS

DE         2204955 A1    8/1973
EP         0006764 A1    1/1980
(Continued)

OTHER PUBLICATIONS

British Patent Office, "British Search Report dated Jun. 19, 2014", British Patent Application No. GB1320960.6, dated Jun. 19, 2014, 4 Pages.
(Continued)

*Primary Examiner* — Darlene P Condra
(74) *Attorney, Agent, or Firm* — Dorsey & Whitney LLP

(57) ABSTRACT

A wheel carrier assembly (104) for a vehicle (110) is clamped on a frame (14) and a carbon composite brake disc 41 of the assembly is bedded by pneumatically applying the brake pads to the brake disc so as to heat the disc in cycles, the wheel carrier assembly then being removed from the frame and fitted to the vehicle.

33 Claims, 6 Drawing Sheets

(51) Int. Cl.
 *B24B 39/06* (2006.01)
 *B60B 27/00* (2006.01)
 *B62D 7/18* (2006.01)

(52) U.S. Cl.
 CPC ....... *B60B 27/0052* (2013.01); *B60B 27/0063* (2013.01); *B62D 7/18* (2013.01); *F16D 2200/0052* (2013.01); *F16D 2250/00* (2013.01)

(56) References Cited

U.S. PATENT DOCUMENTS

| | | | | |
|---|---|---|---|---|
| 4,760,669 A | * | 8/1988 | Maccaferri | B24B 7/16 451/268 |
| 4,825,596 A | * | 5/1989 | Kinner | B24B 7/16 451/14 |
| 5,056,266 A | * | 10/1991 | Norris | B24B 7/17 451/262 |
| 5,472,373 A | * | 12/1995 | Wolters | B24B 7/16 451/259 |
| 5,686,144 A | * | 11/1997 | Thebault | B05D 1/18 427/282 |
| 6,071,180 A | * | 6/2000 | Becker | B24B 7/17 29/894.362 |
| 6,099,387 A | * | 8/2000 | Gilmer | B24B 9/065 451/10 |
| 8,151,434 B2 | * | 4/2012 | Fukao | B24B 7/16 29/557 |
| 2006/0207080 A1 | * | 9/2006 | Keate | B23P 6/00 29/402.07 |
| 2008/0179853 A1 | * | 7/2008 | Kuwabara | B60G 3/20 280/124.134 |
| 2012/0037465 A1 | | 2/2012 | Abe et al. | |
| 2014/0165350 A1 | * | 6/2014 | O'Neil | B24B 39/00 29/90.01 |

FOREIGN PATENT DOCUMENTS

| | | |
|---|---|---|
| GB | 2445361 A | 7/2008 |
| WO | 9527589 A1 | 10/1995 |

OTHER PUBLICATIONS

International Bureau, "International Search Report and Written Opinion dated Sep. 29, 2015", International Application No. PCT/GB2014/053513, dated Sep. 29, 2015, 10 Pages.

* cited by examiner

BRAKE CONDITIONING

CROSS REFERENCE TO RELATED APPLICATIONS

This application is a national stage application under 35 U.S.C. § 371 of International Application No. PCT/GB2014/053513 filed on Nov. 27, 2014, which claims priority to GB Patent Application No. 1320960.6 filed on Nov. 27, 2013, the contents of all of which are hereby incorporated in their entirety by reference.

FIELD

The present invention relates to methods of brake conditioning such as methods of bedding carbon composite brake discs and apparatus for performing such bedding. The invention also relates to bedded in brake discs and to wheel carrier assemblies and vehicles incorporating such discs.

BACKGROUND

Carbon composite material brake discs require a comprehensive bedding in procedure involving the elevation of disc temperature. It is known, in order to do this to take a substantially completed vehicle and repeatedly decelerate it by the use of a brake, the temperature caused in the brakes enabling chemical changes in the carbon structure of the brake discs making them substantially harder and also impermeable to water. However, this is an expensive procedure involving the outdoor use of completed production vehicles which are nearly ready for sale and this is not always desirable. Also, it may be necessary to complete the bedding process to drive the vehicle at high speed, requiring the use of a test or race track, the use of which can also be expensive or such tracks may be a considerable distance from the vehicle production facility making the use inconvenient and yet more costly. This may also cause the consumption of a considerable amount of energy to perform the brake bedding.

SUMMARY

The present invention aims to alleviate at least to a certain extent the problems of prior art.

A first aspect of the invention provides method of bedding a carbon composite material brake disc for use in a vehicle, the method comprising mounting the brake disc to a stationary support rig (such as a stationary frame, preferably of the type secured to a floor), rotatably driving the brake disc and applying frictional engagement to a friction surface of the brake disc to frictionally raise a temperature of the brake disc for bedding conditioning thereof.

Advantageously, the brake disc may be bedded in quickly and without using a vehicle or test track. The brake disc does not need to be taken outdoors where water may damages the material of the brake disc before it has been bedded in. Less energy is consumed to perform the brake bedding.

The method may include mounting the brake disc to the support rig via a wheel hub.

The method may include mounting the brake disc to the stationary support rig via a knuckle adapted to support the brake disc relative to a vehicle body via suspension components.

The method may include mounting the brake disc to the stationary support rig together with a brake calliper and at least one brake pad.

The method may include mounting the brake calliper with at least one hydraulic brake seal associated with each said brake pad.

The method may include supplying pressurised air to the brake calliper to cause each said brake pad to frictionally engage with the brake disc.

The method may include supplying the pressurised air at a pressure of about: (a) 10 to 300 bar, (b) 20 to 100 bar (c) 25 to 60 bar, (d) 30 to 50 bar, (e) 35 to 45 bar, (f) under 100 bar, (g) under 75 or under 60 bar, (h) over 20 bar or (i) about 35, 40 or 50 bar.

The method may include providing the pressurised air from a source, such as a dried shop floor air source, for example at about 8 bar, and increasing the pressure of the air supplied from the source for example by using a pressure intensifier.

The method may include conditioning the brake disc with a plurality of heat cycles, each heat cycle including a warming stage during which a reference temperature of the brake disc is increased and a cooling stage in which the reference temperature is decreased.

The method may include raising the reference temperature to a peak temperature and then lowering the reference temperature to a dropped temperature during each cycle, at least one said peak temperature of at least one cycle being over 300 degrees C., preferably being over 400 or over 500, more preferably over 600 degrees C. Preferably, the disc is heated a plurality of times to said peak temperatures over 550 or over 600 degrees C. The temperature may be carefully controlled in order to provide optimum chemical/structural change within the disc during bedding.

The reference temperature may be a surface temperature of the brake disc measured by a sensor, such as an IR temperature sensor or a data-logging thermocouple.

The method may include providing brake pressure at a substantially constant (or varying) value to a calliper associated with the brake disc during each warming stage. The same brake pressure may be used in each warming stage. Different said brake pressures may be used in different cycles in other embodiments.

The method may include providing said brake pressure for between about 5% and 75% of the time during each cycle, for example between about 20% and 50% or about 15% and 40% of the time during each cycle.

The method may include providing said brake pressure for a smaller proportion of time in at least one cycle with a higher peak temperature than in at least one cycle with a lower peak temperature.

The method may include using a motor to drive the brake disc rotationally at a start speed for the application of frictional heating to the brake disc.

The start speed may be in the region of about 250 to 2500 RPM, preferably about 400 to 2000 RPM, more preferably about 600 to 1750 RPM; about 700 to 1600 RPM, about 800 to 1100 RPM or about 1200 to 1500 RPM being some examples.

The start speed may be selected to be equivalent to the rotational velocity of the brake disc when a vehicle to which the brake disc is to be fitted would be travelling at a speed which is over 70 mph, more preferably at over 100 mph, for example about 100 to 150 mph, 130 mph being one example.

The method may include providing a flywheel rotationally connected to the brake disc, the flywheel being adapted to supply torque to the brake disc while the brake disc is being frictionally heated.

The method may include allowing the rotational speed of the brake disc and flywheel to decrease during frictional heating of the brake disc.

The method may include providing the flywheel with a mass moment of inertia of between 10 and 200 $kgm^2$, preferably between 25 and 100 $kgm^2$, more preferably 40 to 80 $kgm^2$, for example 50 or 75 $kgm^2$.

The brake disc may be for application to a vehicle having four road wheels with brakes and with a kerb or loaded weight of X kg, and the mass moment of inertia of the flywheel may be between about (X/10) and (X/100) $kgm^2$, for example about (X/20) to (X/50) $kgm^2$; the mass moment of inertia optionally being about (X/10) to (X/30) $kgm^2$ when the brake disc is for a front wheel of the vehicle and about (X/30) to (X/50) $kgm^2$ when the brake disc is for a rear wheel of the vehicle.

The method may include cooling the brake disc by directing a cooling air flow thereto.

The method may include providing the frictional engagement to the surface of the brake disc by engaging at least one brake pad therewith.

The method may include securing the brake disc to the stationary support rig via a wheel hub and wheel knuckle, and mounting the at least one said brake pad in a brake calliper secured to the knuckle.

A further aspect of the invention provides a of method assembling a motor vehicle, such as a motor car, which includes a method of bedding a carbon composite material brake disc as in the preceding aspect.

A further aspect of the invention provides a method of assembling a motor vehicle, such as a motor car, which includes carrying out the method set out two paragraphs above, removing the knuckle, wheel hub, brake disc, brake calliper and at least one brake pad all together as an assembly from the stationary support rig and then fitting this assembly still all together to a motor vehicle. This advantageously means that bedding may be carried out on a fully assembled "corner unit" or wheel carrier assembly (composed of such parts), enabling improved parts tracking and efficiency of vehicle production. Completed corner units may be held in stock and sent out to maintenance sites where they may be easily fitted without the requirement to carry out brake bedding locally.

A further aspect of the invention provides a method of bedding a carbon composite material brake disc for use on a vehicle having a hydraulically operated calliper/brake pad assembly, the method comprising assembling the calliper and brake pad assembly for use with and to frictionally engage a brake disc, rotating the brake disc relative to the calliper/brake pad assembly and applying air under pneumatic pressure into the calliper/brake pad assembly to frictionally engage the brake pad onto the brake disc.

This is highly advantageous since the brake disc, indeed optionally the fully assembled wheel carrier unit including the brake calliper, may be bedded without using hydraulic fluid. Therefore it is not necessary to spend considerable time cleaning out the calliper after bedding so as to avoid fluid in the calliper interfering with a vacuum fill of the brake system of a vehicle during vehicle assembly.

The method may include maintaining at least one hydraulic brake seal in an operative position within the calliper/brake pad assembly while applying the air under pneumatic pressure. Thus, inventively, a seal designed for hydraulic operation may be used as an air seal during the bedding process. Due to the use of air, rather than hydraulic brake fluid, the seal can remain in place after bedding and the calliper does not need cleaning as indicated above.

A further aspect of the invention provides a method of bedding a brake component for use in a vehicle, the method comprising mounting a brake disc to a stationary support rig and providing a rotational shaft for driving the brake disc, the shaft including at least one and optionally two articulated joints, such as CV joints, located thereon.

This highly advantageously thus allows for tolerances in build of wheel knuckles and other carrier assembly components since the rotational axis centreline and angle of the brake disc relative to any flywheel or other rotational components which may be used during bedding do not need to be highly accurately set.

The method may include mounting the brake disc on a splined wheel hub and providing a splined connection between the wheel hub and the shaft.

The method may include providing a flywheel at least partially for driving the brake disc, fixing the flywheel to the stationary support rig via a bearing and attaching one end of the shaft to the flywheel.

The method may include providing the brake component as the brake disc.

A further aspect of the invention provides a method of bedding a brake component which includes clamping/attaching at least a brake disc and wheel hub to a support rig, and which includes providing a source of motive torque for rotating at least the brake disc, and which includes the step of preventing the source of motive torque from operating unless an indicator of clamping/attachment security is provided.

This enables an advantageous safety measure. The energy stored in the rotating parts while the method is performed may be extremely large and this helps prevent the loss of any rotational parts and the damage they may cause if they were to come loose.

The method may include establishing a torque setting state during the clamping which is representative of safe clamping in order to provide a signal for enabling operation of the source of motive torque.

A further aspect of the invention provides apparatus for carrying out a method as set out in any previous aspect hereof.

A further aspect of the invention provides a bedding machine for bedding a carbon composite material brake disc for use in a vehicle, comprising a stationary support rig (such as a stationary frame, preferably of the type secured to a floor), a mount for mounting the brake disc to the stationary support rig, and a source of motive rotational torque for rotatably driving the brake disc, and a friction assembly (such as a brake calliper containing at least one brake pad) adapted to apply frictional engagement to a friction surface of the brake disc to frictionally raise a temperature of the brake disc for bedding conditioning thereof.

Advantageously, the brake disc may be bedded in quickly and without using a vehicle or test track. The brake disc does not need to be taken outdoors where water may damage the material of the brake disc before it has been bedded in.

The mount may be adapted to mount the brake disc to the support rig via a wheel hub and a knuckle adapted to support the brake disc relative to a vehicle body via suspension components.

The bedding machine may include an air pressure source adapted to supply pressurised air to a brake calliper of the friction assembly to cause a brake pad to frictionally engage with the brake disc.

The air pressure source may be adapted to supply pressurised air at a pressure of about: (a) 10 to 300 bar, (b) 20 to 100 bar (c) 25 to 60 bar, (d) 30 to 50 bar, (e) 35 to 45 bar, (f) under 100 bar, (g) under 75 or under 60 bar, (h) over 20 bar or (i) about 35, 40 or 50 bar.

The bedding machine may include a pressure increasing device adapted to increase the pressure of the air from the source such as an about 8 to 10 bar dried shop floor air supply.

A further aspect of the invention provides a bedding machine which includes a controller adapted to control conditioning parameters including rotational speed and brake calliper pressure such that conditioning of the brake disc is carried out with a plurality of heat cycles, each heat cycle including a warming stage during which a reference temperature of the brake disc is increased and a cooling stage in which the reference temperature is decreased. Highly accurate and repeatable chemical/structural change within the disc may thus be achieved during bedding.

This may provide a highly repeatable and useful bedding.

The controller may be adapted to control conditioning so as to raise the reference temperature to a peak temperature and then lower the reference temperature to a dropped temperature during each cycle, at least one said peak temperature of at least one cycle being over 300 degrees C., preferably being over 400 or over 500, more preferably over 600 degrees C.

The bedding machine may include a sensor, such as an IR temperature sensor or a data-logging thermocouple, which is adapted to measure the reference temperature as a surface temperature of the brake disc The air pressure source may be adapted to provide brake pressure at a substantially constant (or varying) value to a calliper associated with the brake disc during each warming stage.

The air pressure source may be arranged to apply said brake pressure for between about 5% and 75% of the time during each cycle, for example between about 20% and 50% or about 15% and 40% of the time during each cycle.

The air pressure source may be adapted to provide said brake pressure for a smaller proportion of time in at least one cycle with a higher peak temperature than in at least one cycle with a lower peak temperature.

The bedding machine may include a motor to drive the brake disc rotationally at a start speed for the application of frictional heating to the brake disc.

The motor may be adapted to operate at a power of between about 30 and 200 KW, preferably between 50 and 100 KW; and/or to supply a torque of up to about 250 to 1000 Nm, preferably up to about 300 to 600 Nm or about 350 to 550 Nm.

The motor may be adapted to run with the start speed in the region of about 250 to 2500 RPM, preferably about 400 to 2000 RPM, more preferably about 600 to 1750 RPM; about 700 to 1600 RPM, about 800 to 1100 RPM or about 1200 to 1500 RPM being some examples.

The motor may be adapted to run with the start speed selected to be equivalent to the rotational velocity of the brake disc when a vehicle to which the brake disc is to be fitted is travelling at a speed which is over 70 mph, more preferably at over 100 mph, for example about 100 to 150 mph, 130 mph being one example.

A bedding machine may include a flywheel rotationally connected to the brake disc, the flywheel being adapted to supply torque to the brake disc while the brake disc is being frictionally heated.

The flywheel may have a mass moment of inertia of between 10 and 200 kgm$^2$, preferably between 25 and 100 kgm$^2$, more preferably 40 to 80 kgm$^2$, for example 50 or 75 kgm$^2$.

The brake disc may be for application to a vehicle having four road wheels with brakes and which is adapted to have a kerb weight of X kg, and the mass moment of inertia of the flywheel may be between about (X/10) and (X/100) kgm$^2$, for example about (X/20) to (X/50) kgm$^2$; the mass moment of inertia optionally being about (X/10) to (X/30) kgm$^2$ when the brake disc is for a front wheel of the vehicle and about (X/30) to (X/50) kgm$^2$ when the brake disc is for a rear wheel of the vehicle.

The bedding machine may include an air flow cooler system for cooling the brake disc by directing a cooling air flow towards the brake disk and/or a brake calliper associated with the brake disk The air flow cooler system may be adapted to blow air onto the disk near where the disk is adapted to rotate into a calliper associated therewith and/or towards at least one brake pad within the calliper.

A further aspect of the invention provides a wheel carrier assembly comprising an assembled a knuckle, wheel hub, brake disc, brake calliper and at least one brake pad, the brake disc having been conditioned in accordance with any aspect hereof set out above.

A further aspect of the invention provides a bedding machine for bedding a carbon composite material brake disc for use on a vehicle having a hydraulically operated calliper/brake pad assembly, the machine having an air source for applying air under pneumatic pressure into a calliper/brake pad assembly to frictionally engage a brake pad onto the brake disc.

This is highly advantageous since the fully assembled wheel carrier unit including the brake calliper may be bedded without using hydraulic fluid. Therefore it is not necessary to spend considerable time cleaning out the calliper after bedding so as to avoid fluid in the calliper interfering with a vacuum fill of the brake system of a vehicle during vehicle assembly.

A further aspect of the invention provides a bedding machine for bedding a brake component for use in a vehicle, the machine including a stationary support rig, a rotational shaft for driving the brake component, the shaft including at least one and optionally two articulated joints, such as CV joints, located thereon.

This highly advantageously thus allows for tolerances in build of wheel knuckles and other carrier assembly components since the rotational axis centreline and angle of the brake disc relative to any flywheel or other rotational components which may be used do not need to be highly accurately set.

The shaft may include a splined connection for rotationally-locked engagement with a wheel hub.

A further aspect of the invention provides a bedding machine for bedding a brake component, the machine having a clamp or attachment for attaching at least a brake disc and wheel hub to a support rig, a source of motive torque for rotating at least the brake disc, and a safety interlock for preventing the source of motive torque from operating unless an indicator of clamping/attachment security is provided.

This enables an advantageous safety measure. The energy stored in the rotating parts while the method is performed may be extremely large and this helps prevent the loss of any rotational parts and the damage they may cause if they were to come loose.

The safety interlock may be adapted to process a torque setting state during clamping/attachment which is representative of safe clamping in order to provide a signal for enabling operation of the source of motive torque.

BRIEF DESCRIPTION OF THE DRAWINGS

The present invention may be carried out in various ways and a preferred embodiment of a method of bedding a brake disc for use in a vehicle and apparatus for the same will now be described by way of example with reference to the accompanying drawings in which.

DETAILED DESCRIPTION

Figure 1:
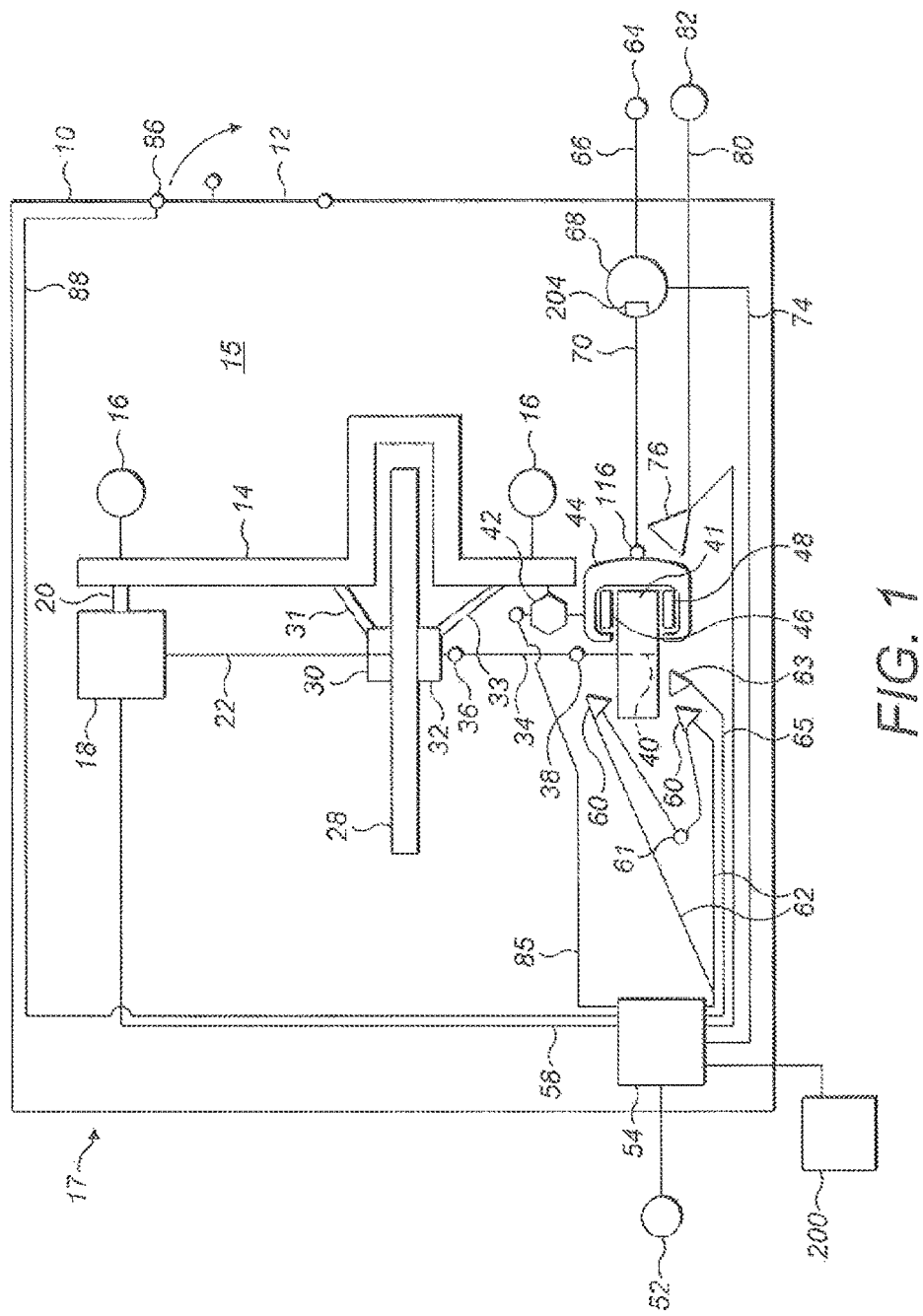
FIG. 1 is a schematic view of preferred apparatus for bedding a carbon composite brake disc for use in a vehicle in accordance with a preferred embodiment of the present invention.

As shown in FIG. 1, in a preferred embodiment of the present invention, a room 10 with a door 12 for personnel access contains a brake bedding machine 17 including frame 14 or stationary support structure which may be secured to the floor 15 of the room by mountings 16.

A motor 18 is secured by a mount 20 to the frame 14 and is connected by a drive shaft 22 to a flywheel 28, the flywheel being mounted by bearings 32, which are secured by mounts 31, 33 to the frame 14. A drive shaft 34 connects the flywheel 28 via CV joints 36, 38 to a splined connection 40 with brake disc 41.

Figure 6:
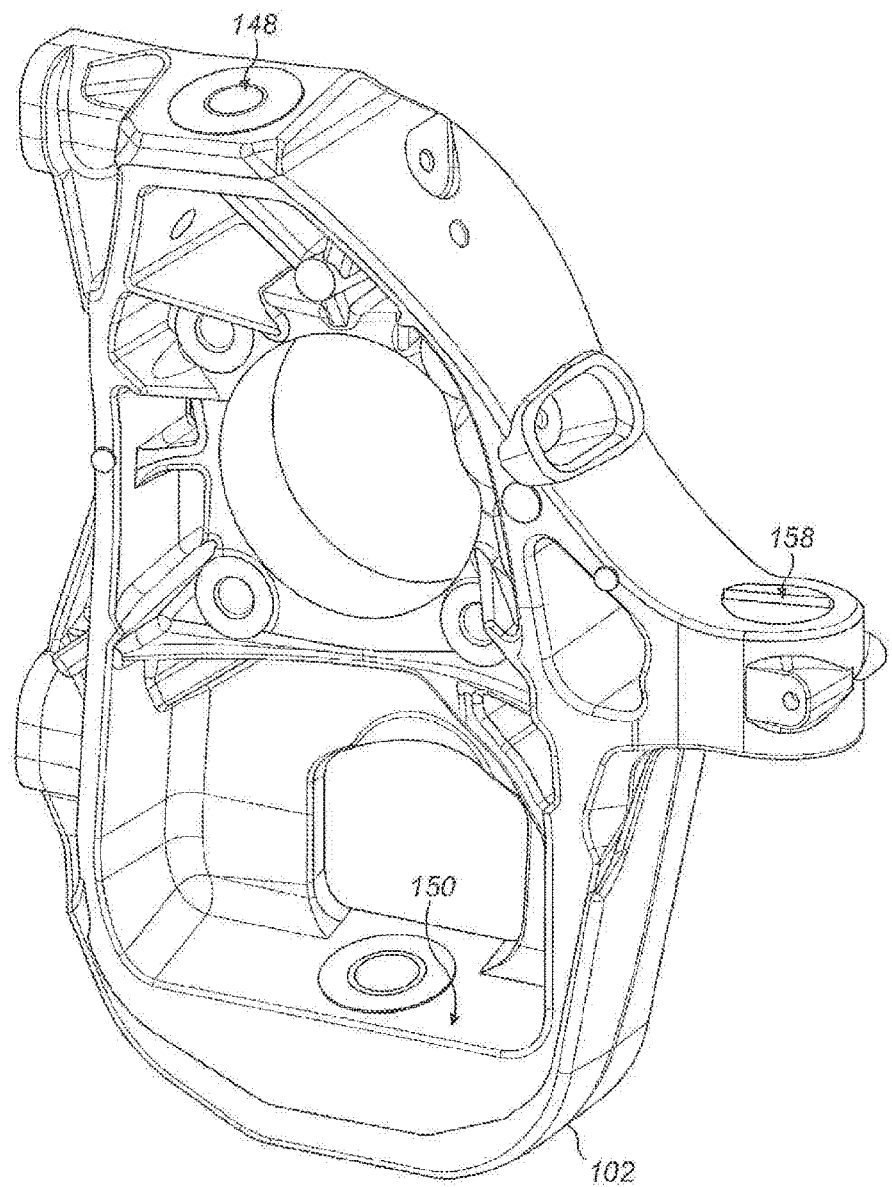
FIG. 6 is a view schematically showing how a knuckle for holding the brake disc can be clamped in order to hold the brake disc in position in the apparatus of FIG. 1.
Figure 7:
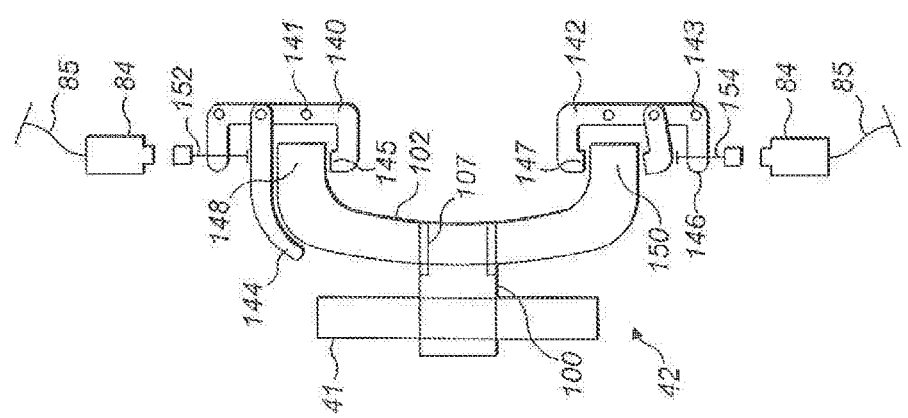
FIG. 7 is a schematic view showing clamps for the knuckle of FIG. 6 and torque wrenches for controlling clamping force.

The brake disc 41 is connected to the frame 14 via a wheel hub 100 and knuckle 102, the wheel hub and knuckle not being shown in FIG. 1 for the purposes of clarity. The knuckle 102 is shown in FIGS. 6, 7, and 8 and is mounted via a clamping arrangement 42 to the frame 14.

Figure 8:
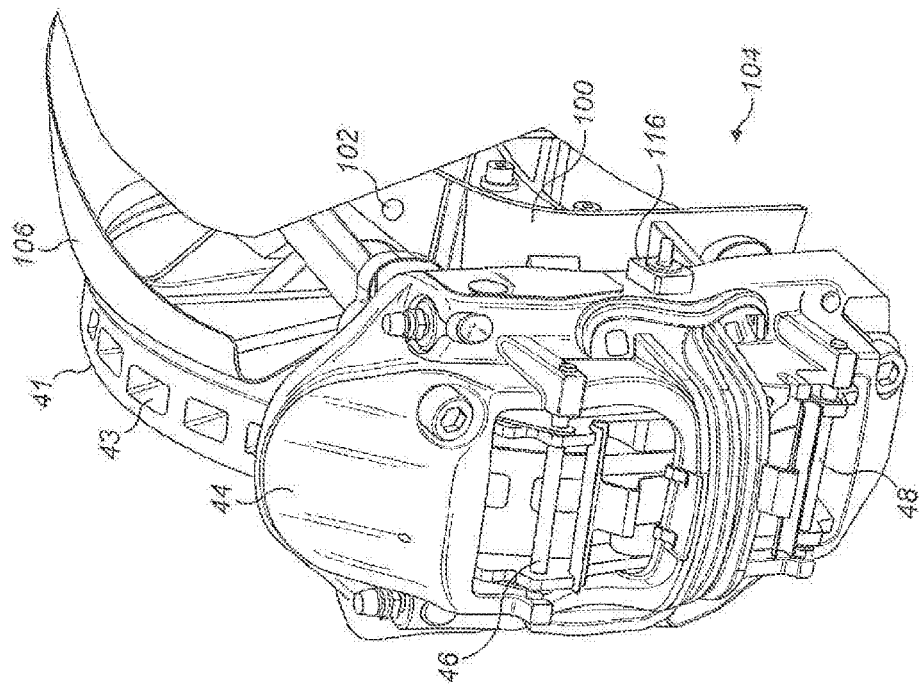
FIG. 8 shows the brake disc with an associated calliper as well as part of an associated wheel hub and dust guard and part of the knuckle.
Figure 9:
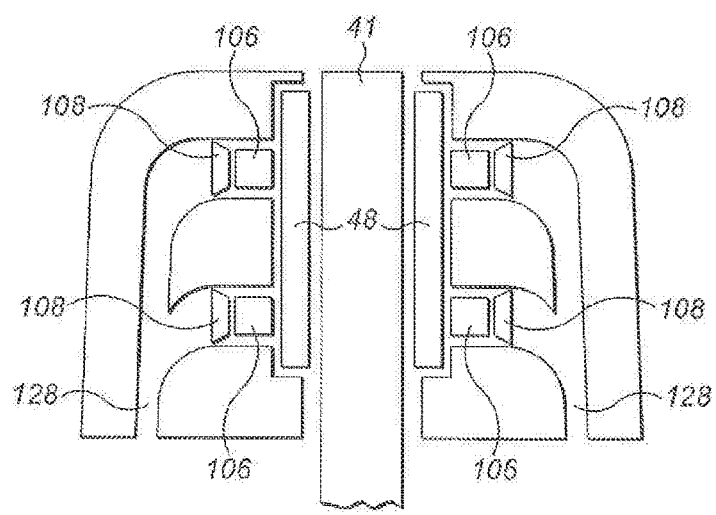
FIG. 9 is a schematic view of part of the calliper and part of the brake disc, schematically showing calliper pistons and hydraulic seals.
Figure 10:
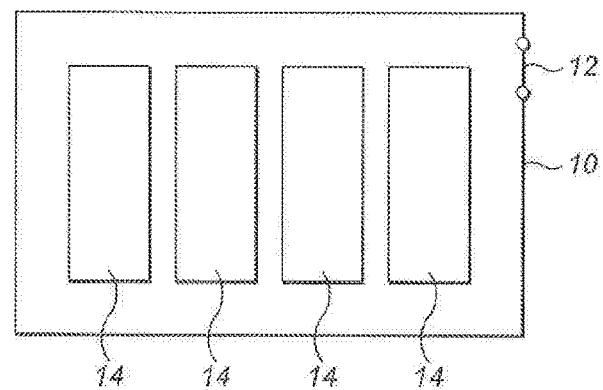
FIG. 10 shows a modification in which the bedding apparatus of FIG. 1 may in a modification be housed in a room together with three other similar bedding apparatuses, two being for front wheel brake disc and two being for rear wheel brake disc bedding.

As can be seen in FIG. 8, the knuckle 102, wheel hub 100 and brake disc 41 are part of a "corner unit" or wheel carrier assembly 104 which also includes a dust shield 106 secured to the knuckle 104 and a calliper 44 secured to the knuckle 102. Note that only part of the knuckle 102 is shown in FIG. 8. As partly shown in FIG. 8 and schematically shown in FIG. 9, the calliper 44 includes within it brake pads 46, 48, calliper pistons 106 and hydraulic seals 108. During normal use of the wheel carrier assembly 104 on a vehicle 110 (FIG. 4) hydraulic pressure may be applied via a hydraulic inlet 116 of the calliper 44 using traditional brake pipes 118, brake pedal 120 an associated conventional brake componentry 122.

Figure 4:
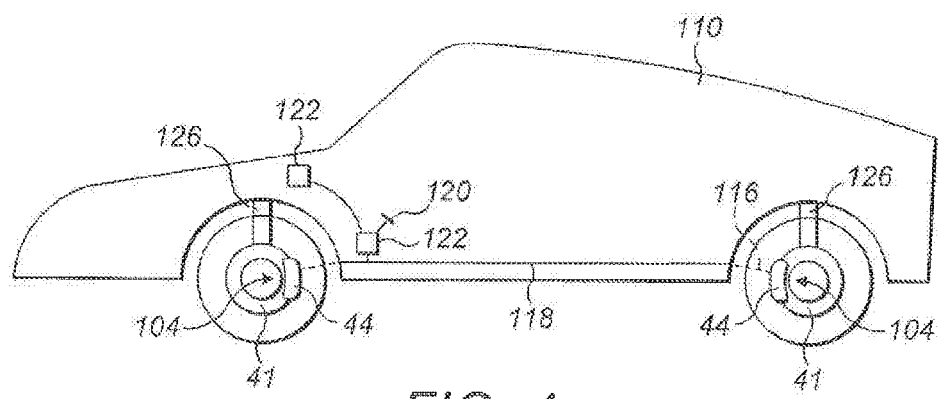
FIG. 4 shows an example of a motor vehicle incorporating four brake discs bedded in using the apparatus of FIG. 1.

As shown in FIG. 4, the wheel carrier assemblies 104 may be attached to chassis or body 124 of the vehicle 110 by connection of the knuckle 102 to the body 124 via suspension components 126.

When hydraulic fluid pressure is applied at the inlet 116, internal calliper supply paths 128 (FIG. 9) are pressurised so as to press on the hydraulic fluid seals 108 which in turn push the calliper pistons 106 onto the brake pads 46, 48 (in practice, the pads may consist of metal backing plates with friction material mounted thereon for engagement with the disc 41).

As shown in FIG. 7, the brake disc 41 is secured to the wheel hub 100 and the wheel hub 100 is mounted by bearings 107 to the knuckle 102. This arrangement may be varied in accordance with various conventional forms of practice.

The corner unit mount or clamping arrangement 42 as shown in FIGS. 7 and 6 may include an upper clamp 140 and lower clamp 142 which may be securely fitted to the frame 14 using connections 141, 143. The upper 140 and lower 142 clamps may include moveable clamp members 144, 146 and reaction elements 145, 147, the clamp members 144, 146 being adapted to be torqued into clamping engagement with the respective surfaces of the knuckle 102 at respective upper and lower clamp locations 148, 150 of the knuckle 102 (FIGS. 6 and 7).

Thus, upper 152 and lower 154 threaded screws may each be torqued up to reach respective predefined torques and therefore ensure that a predefined safe clamping is effected between the knuckle 102 and the frame 14. The screws 152, 154 may be torqued by the torque wrenches/readers 84 which may provide signals along torque data flow path 85 to system controller 54 which prevents operation of the motor 18 without receiving a signal indicative that the wheel carrier assembly 104 is in position and securely clamped with the torques on the screws 152, 154 set to predetermined amounts.

As shown in FIG. 6, the upper 140 and lower 142 clamps may be supplemented by a third clamp assembly (not shown) which may clamp onto/around the knuckle 102 at third clamp location 158. In a similar way, the clamp at the third clamp location 152 may be clamped to a pre-set level, such as by using a torque screw similar to screws 152, 154.

Figure 2:
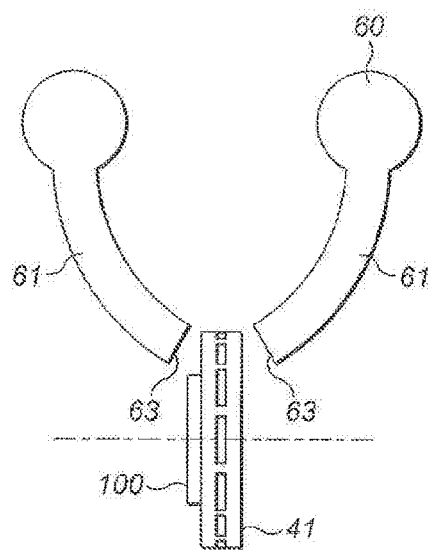
FIG. 2 schematically shows air cooling equipment used in the apparatus of FIG. 1.
Figure 3:
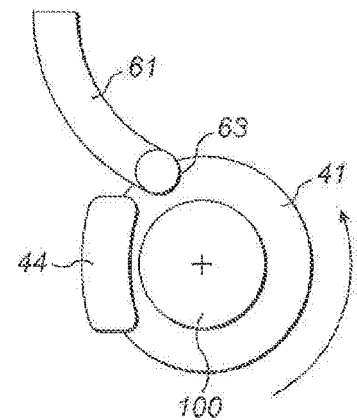
FIG. 3 is a side view of some of the apparatus shown in FIG. 2.

As shown in FIG. 1, an electrical supply 52 is connected to the system controller 54. Furthermore, the system controller 54 is connected to the motor 18 by a motor control/power pathway 58 for controlling the motor 18. Also as shown in FIG. 1, cooling fan/blower ducts 60 are connected via cooling fan motor power/control pathway 62 to the system controller 54. As shown in FIG. 2 and in FIG. 3, outlet ducts 61 may have exits nozzles 63 directed at the brake disc 41 and/or calliper 44 for cooling purposes. During use of the apparatus, in one embodiment, the outlet diameter of the nozzles 63 is about 9 centimeters, for example 5 to 20 centimeters, and blows cooling air at approximately 10 to 20 or 25 degrees C. at about an exit velocity of 40 mph to cool the disc 41 and calliper 44 both during bedding and in a cool down cycle after bedding heat treatment has been completed.

Also as shown in FIG. 1, an optical IR disc surface temperature sensor 63 is utilised in order to record surface temperature of the brake disc 41 during brake bedding and the temperature is fed via data communication pathway 65 to the system controller 54 where it is logged and may be digitally attached to data referencing the wheel carrier assembly 104 or its components for future reference.

FIG. 1 also shows shop floor compressed air source 64 which is adapted to supply compressed air at about 6 to 8 bar to a pneumatic intensifier 68, the pneumatic intensifier 68 being connected to the system controller 54 via pneumatic intensifier power/control pathway 74. The pneumatic intensifier 68 (which may include e.g. integrally an accumulator, plenum or cylinder for storage of high pressure air) is also connected via an air conduit 70 to calliper fluid inlet 116 so as to be capable of operating the calliper 44 with air instead of hydraulic fluid, providing pressure in the conduit 70 raised up to about 30 to 50 bar.

FIG. 1 also shows a dust extractor nozzle 76 which is connected via a dust extractor power/control pathway 78 to the system controller 54, the dust extractor nozzle 76 being connected via an extraction line 80 to a dust cyclonic filter/exhaust outlet 82, whereby brake dust or other waste generated during the bedding process may be safely collected.

In the example shown in FIG. 5, the brake disc 41 is subjected to 8 cycles to complete its bedding process, as follows:

First, the wheel carrier assembly 104 is clamped in position on the frame 14 as described above. Next, all persons leave the room 10 and the door 12 is shut and locked. Door lock/sensor 86 sends a signal along door lock data flow path 88 to the system controller 54. Using a master controller 200 located outside the room, an operator (not shown) sends a signal using the master controller 200 to the system controller 54 that bake bedding is to commence. The system controller 54 first checks via torque data flow path 85 that the clamp screws 152, 154 are sufficiently torqued by the torque/wrenches/readers 84. With the door locked and the wheel carrier assembly 104 securely clamped, the dust extractor nozzle 76/cyclonic filter/exhaust outlet 82 is switched on and the pneumatic intensifier 68 is ready for action with an internal solenoid 204 thereof being ready to switch on high pressure air supply along conduit 70. Likewise, optical infrared disc surface temperature sensor 63 is switched on as are the cooling fans/blowers 60.

Figure 5:
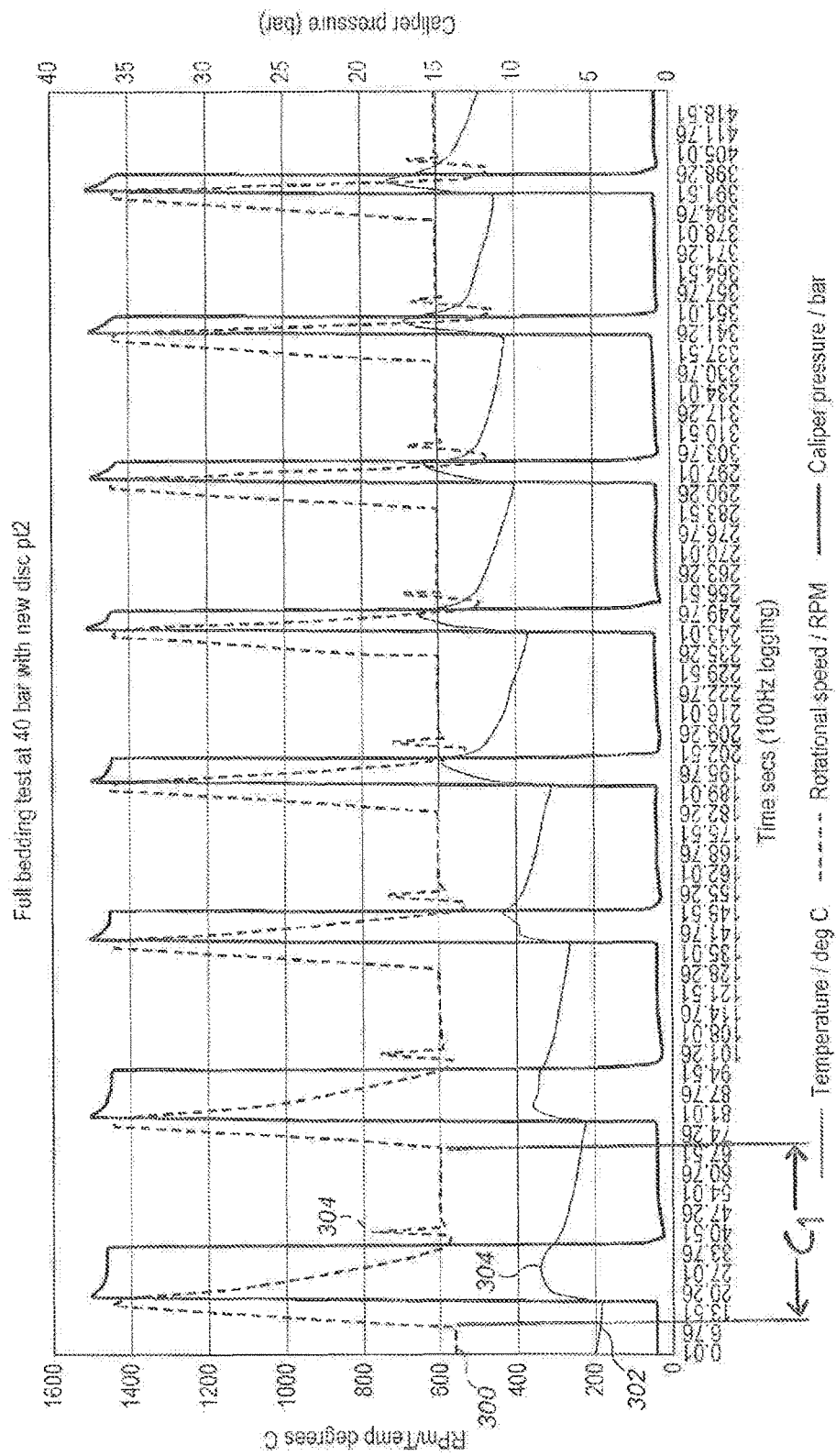
FIG. 5 is a bedding-in process chart showing brake disc surface temperature, pressure brake disc rotational speed and brake calliper pneumatic pressure against time, as implemented when using the apparatus of FIG. 1 to produce the brake discs and vehicle of FIG. 4.

The controller 54 then causes the motor 18 to drive the shafts 22, 34 and the flywheel 28 and brake disc 41 up to an idle speed of approximately 550 rpm at point 300 in FIG. 5. During this period, brake disc temperature may rise to approximately 200 degrees C. as shown at 302 in FIG. 5. Then, at the start of a first bedding cycle "C1" the motor 18 accelerates the rotating components up to just over 1400 rpm.

Next, the solenoid 204 of the pneumatic intensifier 68 is opened and the pressure on line 70 is almost immediately raised to approximately 37 bar thereby applying the brake pads 46, 48 frictionally to the brake disc 41. Torque on the motor 18 is almost simultaneously switched off and over a period of approximately 20 seconds, the rotational speed of the spinning components is slowed down by the action of brake pads 46, 48 on the brake disc 41 approximately linearly to about 600 rpm. During this period, the brake disc temperature peaks at point 304 in FIG. 5 at approximately 350 degrees C.

Then, the solenoid 204 is closed and the line 70 is vented and after a short speed transient 304 rotational speed is set to approximately 600 rpm.

Then, the brake disc temperature reduces to about 225 degrees C. At the end of the cycle C1, the next cycle of the eight cycles shown commences. During each cycle, the rotational speed is raised to just over 1400 rpm and it is then slowed during the brake applied period to approximately 600 rpm. As the cycles progress, the peak temperature of the disc surface in cycle 2 is approximately 375 degrees C., the next cycle has a peak temperature of about 425 degrees C., the next cycle has a peak temperature of approximately 600 degrees C. and the following cycles all have peak temperatures of between 600 and about 750 degrees C. During each cycle, the temperature drops from the peak temperature by about 150 to 225 degrees C. As the cycles progress through the series thereof, the disc temperature generally becomes higher in average terms as well as in terms of peak temperature and lowest cycle temperature. Additionally, the proportion of the cycle during which the brakes are "applied" by the application of the approximately 37 bar of pressure along the line 70 becomes smaller, this being in order to avoid further increased temperature and to control temperature generally to a range within the later cycles of about 400 to 650 degrees C.

After the eighth cycle, the rotational speed is set to 100 RPM in a cooling mode. Once disc temperature lowers to 50 degrees C., the rotation is stopped and door lock/sensor 86 is unlocked to permit access to the room 10. This prevents any possibility of the operator or anybody else being burnt by contact with hot parts.

By the end of all the cycles, the material of the carbon composite brake disc 41 is chemically changed and is made substantially harder and also impermeable to water.

It is also noted, as shown in FIG. 8 that the brake disc 41 is ventilated with conventional ventilation slots 43.

In a modification of the apparatus, four frames 14 and all of the other apparatus shown in the FIG. 1 may be installed in a larger room 10 with a door 12 and four brake discs may be bedded in a similar way simultaneously. These may thus involve two front wheel carrier assemblies and two rear carrier assemblies for a vehicle having four wheels and all of the brake discs 41 for a motor car, for example, may be simultaneously bedded in. The moment of inertia of the flywheels for front brake discs may be higher than for rear brake discs.

With a static rig (frame 14 and other components) the apparatus and method of bedding described above provide a higher quality bedded disc than available in the prior art due to the use of the more repeatable and objective bedding procedure conducted in a stable environment. The process is also safe, cost effective and is less harmful to the environment than prior methods. The clamping system advantageously holds the corner unit/wheel carrier assemble 104 securely and without damaging it. The knuckle 102 can be provided in a configuration ready for assembly onto the suspension components of a vehicle, including, for example Nylon (trade mark) inserts and these are not damaged by the clamps. The clamping arrangement may involve a sliding bed (not shown) to allow the wheel carrier assembly 104 to be slid to engage the splined shaft 34, the shaft 34 including the CV joints 36, 38 at or near each end so as to allow for the transmission of torque without loss from the flywheel due to the positioning of the wheel carrier assembly 104, irrespective of the position in which the wheel carrier assembly 104 is fixed. This greatly simplifies the mounting of the wheel carrier assembly as it removes the need to accurately place the corner unit in the bedding machine 17 in relation to the centre line of the flywheel 28 and variable tolerances in the manufacture of the components of the wheel carrier assembly 104 can be accommodated. Thus, vibration due to an out of balance/out of position wheel corner unit 104 can be eliminated or minimised.

The drive shaft 34 may wear after a considerable number of multiple operations and advantageously can easily be changed as part of regular preventative maintenance of the machine 17.

A considerable amount of kinetic rotational energy is generated during the process and the components described above enable the corner unit/wheel carrier assembly 104 to be secured robustly into the bedding machine 17 and also ensure that the machine 17 cannot be started unless the corner unit 104 is fully clamped into position, and the safety features also ensure that the room must be evacuated and the door 12 locked before use. The use of tightenable threaded screws or bolts 152, 154 ensures that correct clamp loads are applied to secure the corner unit/wheel carrier assembly 104 in position. Both the torque and angle of these screws may be controlled using an Atlas Copco DC (registered trade mark) tool 84 in order to interlock the machine 17 to prevent it from running unless all of the screws have been tightened correctly.

The system allows standard dried shop floor compressed air at 6 or 8 bar to pass into the pneumatic intensifier 68 which pressurises the air to the required pressure for the line 70, which may be somewhere between 30 and 50 bar, about 37 bar in the example of FIG. 5. The pneumatic intensifier may include or communicate with a cylinder for storing the air at higher pressure. Advantageously, pneumatic air pressure is used to pressurised the calliper pistons 106 rather than traditional hydraulic fluid as will be used in the motor vehicle once the wheel carrier assembly 104 is installed on a vehicle. The use of air to pressurise the calliper enables the calliper assembly to remain dry for assembly into the vehicle at a later stage. This is highly advantageous since in some automotive production brake system filling with hydraulic fluid is accomplished by vacuuming the brake lines 118 of the vehicle and releasing brake fluid into the vacuum without having to resort to bleeding air from the system. If the calliper 44 was "wet" with hydraulic brake fluid then it would not be possible to achieve the required vacuum to completely filled the braking system and the use of air to pressurise the calliper 44 during the brake bedding process is considered highly advantageous.

The bedding process is also made safe by the interlock from the door lock/sensor 86 which prevents operation unless the door is closed/locked and nobody is in the room 10. The system controller 54 and master controller 200 which may be a PC based system operate the motors and pneumatics. The system controller 54 may comprise a programmable logic controller (PLC).

An operator may start the machine 17 by entering vehicle details into the master controller 200 using a bar code scanner so as to ensure that the correct parameters are used for the discs in question as different types and sizes of discs may be bedded by the machine. The flywheels may then be accelerated using the powerful electric motors 18, for example to the just over 1400 rpm speed shown in FIG. 5, or to a different speed such as 1200 rpm or a lower speed.

The flywheels may represent a similar amount of rotational inertia to that which would be generated by a vehicle to which the wheel carrier assemblies are to be fitted while it is travelling at approximately 100 to 150 mph. The electric motors are relatively powerful and are capable of accelerating the flywheel to operating speed (say 1200 or just over 1400 rpm, in about 20 seconds). This short period is advantageous since it prevents heat being lost from the disc 41 and soaking into the calliper 44 which could undesirably heat up the calliper, since the calliper must remain at about 110 degrees or less so as to prevent damage to the hydraulic fluid seals 108 which are made of silicone. The process is controlled by the PC or master controller 200 to define sequence of accelerations, decelerations and cool down runs until the desired bedded brake surface is achieved as appropriate to the vehicle discs 41 used. The brake dust generated by the process is conveniently removed and filter as discussed above.

Advantageously, the end of the bedding process may involve a cool down process in which the discs are turned at about 100 RPM while the air blowers 61, 60 are used to assist in cooling. This therefore will occur after the final cycle shown in FIG. 5 to bring the disc temperature down from the approximately 500 degrees shown at the end of that cycle in FIG. 5. The door lock/sensor 86 is controlled to prevent to door 12 from being opened so that no human/operator access to the room 10 is permitted until the sensed temperature is at or below 50 degrees C. The shafts 22, 34 are then stopped and the door 12 may then be opened. This advantageously ensures that the operator cannot be burnt by the brake components when they are hot.

The optical infrared sensor 63 monitors disc surface temperature which is recorded against the vehicle by the PC 200 for quality and traceability purposes. In the specific embodiment, the IR sensor 63 is not used for close loop temperature control during the bedding procedure although such control could be used in other embodiments.

The process may be compressed into a very much shorter time cycle than when using a car on a test track to bed the brakes in and the energy requirements for the bedding in process are also lowered. The process can be conducted independently of weather conditions in a stable environment, improving repeatability and also removing any damage which may be caused to the discs before bedding in by moisture which may be picked up on a test track. The process can also be conducted at any time of day as it does not cause a local nuisance, such as by way of noise, to neighbours. The bedding process does not require a vehicle to complete it so no vehicle damage is caused during the bedding process. The heat generated by the bedding process can also be captured and use to heat the building housing the apparatus 17 to lower the energy used. Furthermore, new or replacement service parts may be bedded in before they are sent off to dealers, resulting in large saving in time and costs for aftersales functions.

There now follows a discussion of a number of features relating to the preferred embodiments (A) In some preferred embodiments:
Flywheel size/mass (e.g. moment of inertia) are capable of simulating equivalent vehicle mass of about 1700-1900 Kg, advantageously enabling simulation of the rotational inertia of such a vehicle under heavy braking.
Flywheels used for bedding front disks for such a vehicle can be optionally rated at 75 $kgm^2$.
Flywheels used for bedding rear disks for such a vehicle can be optionally rated at 50 $kgm^2$.
Motor torque required is selected so as to be advantageously capable of accelerating the respective flywheel as quickly as reasonably possible to prevent an undesirably large loss of heat in system and heat transfer into caliper.
Rated motor torque in some embodiments is selected high enough to allow acceleration of 75 $kgm^2$ and 50 $kgm^2$ flywheels to 1600 RPM in <20 secs.
Rated motor power in some embodiments may be 90 KW for front and 60 KW drives for rear discs with torque of about 537 Nm and 358 Nm respectively, 7.16 ms/2 acceleration and 23.4 secs from 0-1600 RPM.

(B) In some embodiments some features may be varied or tuned in accordance with the following:

Maximum rotational drive speed, useful for simulating a vehicle driving at a certain speed, may in some embodiments be:

Up to 1600 rpm on each shaft (e.g. when there are 4 machines set up in a room in parallel with a shaft/motor/flywheel/frame for each), enough for significant headroom above setups that may normally only require speeds at about 50 to 70% of this speed.

Pressure to be provided by pressure intensifier, accumulator (plenum) and solenoid valve based system to allow clamping of discs.

Up to 50 bar to be made available via solenoid valve activation, optionally having two circuits with regulators to allow two separate pressures to be used in test modes.

Cooling Air Flow Speed, required to cool discs and callipers both during testing/bedding but also after running.

Up to approx. 40 mph.

Bedding profile

The bedding machine optionally and desirably has capability of running a set program of accelerations, decelerations etc. according to a pre-defined sequence.

(C) Discussion of a number of parameters employed in a specific example in accordance with the embodiment described above with reference to the drawings:

Drive speed.

Various drive speeds may be employed, for example between 800-1100 RPM or up to about 1500 RPM.

Clamping Pressure 45 bar pneumatic pressure.

Cooling air flow speed

Fan motor set at 45 Hz (90% of max. capability).

Cooling air flow direction

For front wheel brake corner units—Air directed directly onto surface of disc as it enters calliper (see FIG. 2—this allows disc to remain fairly hot outside the calliper to accomplish heat treatment but be cooled somewhat more again before entering the calliper so as to avoid calliper overheating), 90 mm ducting. Also some air directed at front of pads in centre of calliper.

For rear wheel brake corner units—No cooling air on disc surface, some air directed at front of pads in centre of calliper.

Bedding profile

Instead of 8 cycles as shown as described above, a plurality of (e.g. three) bedding runs of a plurality of (e.g. five) accelerations and decelerations to/from certain RPM, each with a defined cool-down period in between may be used.

Instead of bedding a carbon composite material brake disk, the method and apparatus described in the embodiments hereof may alternatively be employed for conditioning other frictional components or other carbon composite materials, or components such as brake disks or pads made from other materials.

Various modifications may be made to the embodiments described above without departing from the scope of the invention defined by the accompanying claims.

What is claimed is:

1. A method of bedding a carbon composite material brake disc for use in a vehicle, the method comprising:
   mounting the brake disc to a support rig via a knuckle adapted to support the brake disc relative to a vehicle body via suspension components;
   rotatably driving the brake disc; and
   applying frictional engagement to a friction surface of the brake disc to frictionally raise a temperature of the brake disc for bedding conditioning thereof.

2. A method as claimed in claim 1, further comprising mounting the brake disc to the support rig via a wheel hub.

3. A method as claimed in claim 1, further comprising mounting the brake disc to the support rig together with a brake calliper and at least one brake pad.

4. A method as claimed in claim 3, further comprising mounting the brake calliper with at least one hydraulic brake seal associated with each of the at least one brake pad.

5. A method as claimed in claim 3, further comprising supplying pressurised air to the brake calliper to cause each of the at least one brake pad to frictionally engage with the brake disc.

6. A method as claimed in claim 5, further comprising supplying the pressurised air at a pressure of about: (a) 10 to 300 bar, (b) 20 to 100 bar, (c) 25 to 60 bar, (d) 30 to 50 bar, (e) 35 to 45 bar, (f) under 100 bar, (g) under 75 or under 60 bar, (h) over 20 bar, or (i) about 35, 40, or 50 bar.

7. A method as claimed in claim 5, further comprising providing the pressurised air from a source and increasing the pressure of the air supplied from the source.

8. A method as claimed in claim 1, further comprising conditioning the brake disc with a plurality of heat cycles, each heat cycle including a warming stage during which a reference temperature of the brake disc is increased and a cooling stage in which the reference temperature is decreased.

9. A method as claimed in claim 8, further comprising raising the reference temperature to a peak temperature and then lowering the reference temperature to a dropped temperature during each cycle, at least one peak temperature of at least one cycle being over 300 degrees C.

10. A method as claimed in claim 9, wherein the reference temperature is a surface temperature of the brake disc measured by a sensor.

11. A method as claimed in claim 9, further comprising providing brake pressure at a substantially constant or varying value to a calliper associated with the brake disc during each warming stage.

12. A method as claimed in claim 11, further comprising providing the brake pressure for between about 5% and 75% of the time during each cycle.

13. A method as claimed in claim 12, further comprising providing the brake pressure for a smaller proportion of time in at least one cycle with a higher peak temperature than in at least one cycle with a lower peak temperature.

14. A method as claimed in claim 1, further comprising using a motor to drive the brake disc rotationally at a start speed for the application of frictional heating to the brake disc.

15. A method as claimed in claim 14, wherein the start speed is in the region of about 250 to 2500 RPM.

16. A method as claimed in claim 15, wherein the start speed is selected to be equivalent to the rotational velocity of the brake disc when a vehicle to which the brake disc is to be fitted is travelling at a speed which is over 70 mph.

17. A method as claimed in claim 15, further comprising providing a flywheel rotationally connected to the brake disc, the flywheel being adapted to supply torque to the brake disc while the brake disc is being frictionally heated.

18. A method as claimed in claim 17, further comprising allowing the rotational speed of the brake disc and flywheel to decrease during frictional heating of the brake disc.

19. A method as claimed in claim 17, further comprising providing the flywheel with a mass moment of inertia of between 10 and 200 kgm$^2$.

20. A method as claimed in claim 17, wherein the brake disc is for application to a vehicle having four road wheels with brakes and which is adapted to have a kerb weight of X kg, and in which the mass moment of inertia of the flywheel is between about (X/10) and (X/100) kgm$^2$.

21. A method as claimed in claim 1, further comprising cooling the brake disc by directing a cooling air flow thereto.

22. A method as claimed in claim 1, further comprising providing the frictional engagement to the surface of the brake disc by engaging at least one brake pad therewith.

23. A method as claimed in claim 22, further comprising:
securing the brake disc to the support rig via a wheel hub and the knuckle; and
mounting the at least one brake pad in a brake calliper secured to the knuckle.

24. A method of assembling a motor vehicle, comprising:
carrying out the method of claim 23;
removing the knuckle, wheel hub, brake disc, brake calliper, and at least one brake pad all together as an assembly from the support rig; and then
fitting the removed assembly to a motor vehicle.

25. A method of assembling a motor vehicle, comprising a method of bedding a carbon composite material brake disc as claimed in claim 1.

26. A wheel carrier assembly comprising an assembled knuckle, wheel hub, brake disc conditioned in accordance with claim 1, brake calliper, and at least one brake pad.

27. A motor vehicle including the wheel carrier assembly as claimed in claim 26.

28. A method of bedding a carbon composite material brake disc for use on a vehicle having a hydraulically operated calliper and brake pad assembly, the method comprising:
assembling the calliper and brake pad assembly for use with and to frictionally engage a brake disc;
rotating the brake disc relative to the calliper and brake pad assembly;
applying air under pneumatic pressure into the calliper and brake pad assembly to frictionally engage the brake pad onto the brake disc; and
maintaining at least one hydraulic brake seal in an operative position within the calliper and brake pad assembly while applying the air under pneumatic pressure.

29. A method of bedding a brake component for use in a vehicle, the method comprising:
mounting a brake disc to a stationary support rig;
providing a rotational shaft for driving the brake disc, the shaft including at least one articulated joint;
providing a flywheel at least partially for driving the brake disc;
fixing the flywheel to the stationary support rig via a bearing; and
attaching one end of the shaft to the flywheel.

30. A method as claimed in claim 29, further comprising:
mounting the brake disc on a splined wheel hub; and
providing a splined connection between the wheel hub and the shaft.

31. A method as claimed in claim 29, further comprising providing the brake component as the brake disc.

32. A method of bedding a brake component, the method comprising:
clamping at least a brake disc and wheel hub to a support rig;
providing a source of motive torque for rotating at least the brake disc; and
preventing the source of motive torque from operating unless an indicator of clamping security is provided.

33. A method as claimed in claim 32, further comprising establishing a torque setting state during the clamping which is representative of safe clamping in order to provide a signal for enabling operation of the source of motive torque.

\* \* \* \* \*